United States Patent [19]

Kanazawa

[11] Patent Number: 4,738,118
[45] Date of Patent: Apr. 19, 1988

[54] AIR CONDITIONER

[75] Inventor: Hidetoshi Kanazawa, Fujinomiya, Japan

[73] Assignee: Kabushiki Kaisha Toshiba, Kawasaki, Japan

[21] Appl. No.: 15,023

[22] Filed: Feb. 17, 1987

Related U.S. Application Data

[62] Division of Ser. No. 750,269, Jul. 1, 1985, Pat. No. 4,663,942.

[30] Foreign Application Priority Data

Jul. 4, 1984 [JP] Japan .................... 59-137325

[51] Int. Cl.⁴ .................... F25B 1/00
[52] U.S. Cl. .................... 62/215; 417/45
[58] Field of Search .................... 62/227, 228.4, 229, 62/215; 417/45; 318/806, 808, 341

[56] References Cited

U.S. PATENT DOCUMENTS

| | | | |
|---|---|---|---|
| 4,259,845 | 4/1981 | Norbeck | 318/806 X |
| 4,407,139 | 10/1983 | Ide et al. | 62/215 |
| 4,417,193 | 11/1983 | Hirata | 318/808 X |
| 4,488,100 | 12/1984 | Fudii et al. | 318/806 X |

FOREIGN PATENT DOCUMENTS

| | | |
|---|---|---|
| 3209509 | 10/1982 | Fed. Rep. of Germany . |
| 57-183297 | 11/1982 | Japan . |
| 0054789 | 3/1984 | Japan .................... 417/45 |

Primary Examiner—William E. Wayner
Attorney, Agent, or Firm—Cushman, Darby & Cushman

[57] ABSTRACT

An air conditioner having a heat exchange cycle which includes at least a compressor motor that is driven by an inverting apparatus at a variable speed, an indoor heat exchanger and an outdoor heat exchanger is provided. This air conditioner comprises a memory for storing a plurality of voltage to frequency ratio pattern data that is predetermined in accordance with different load states of the compressor motor for control of the inverting apparatus, a load state detector which is coupled at a predetermined position in the air conditioner and detects a variation in load of the compressor motor with respect to a plurality of predetermined states, a selector which receives the result of detection by the load state detector and supplies a pattern selection signal to selectively read out a voltage to frequency ratio pattern data corresponding to this detection result to the memory, and a controller which receives the voltage to frequency ratio pattern data read out selectively from the memory in response to the pattern selection signal and supplies a predetermined control output corresponding to the load variation to the inverting apparatus.

4 Claims, 5 Drawing Sheets

F I G. 7
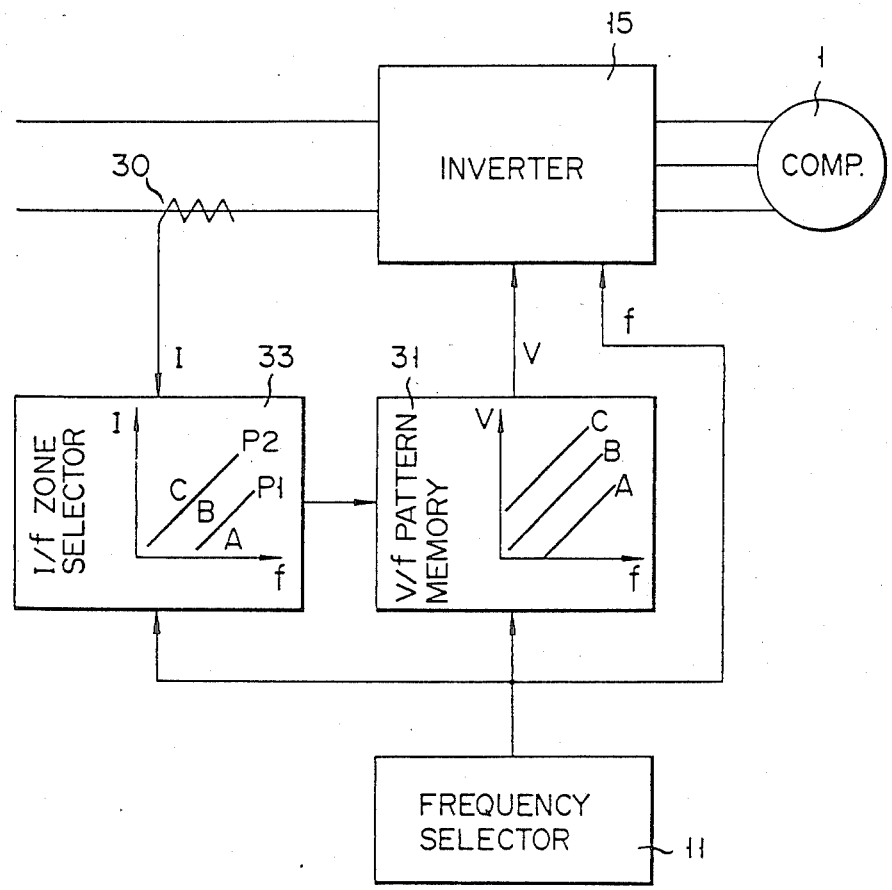

AIR CONDITIONER

This is a division of application Ser. No. 750,269, filed July 1, 1985, now U.S. Pat. No. 4,663,942.

BACKGROUND OF THE INVENTION

This invention relates to an air conditioner and, more particularly, to an improvement in an air conditioner having a compressor motor which is driven at a variable speed by an inverting apparatus.

Recently, air conditioners in which the rotating speed of a compressor motor is driven at a variable speed by an inverting apparatus are rapidly coming into widespread use, since they are excellent in terms of energy saving and comfort as compared with conventional air conditioners in which the compressor motor is ON-/OFF controlled.

However, hitherto, there is only one kind of an output voltage to frequency ratio pattern (hereinafter, referred to as a V/f pattern) of the inverting apparatus for driving the compressor motor of the air conditioner at a variable speed. The compressor motor is driven at a constant V/f ratio irrespective of the load condition of the air conditioner, so that there is a drawback such that it is difficult to perform the operation with high efficiency. In addition, there is another drawback such that the operation of the compressor motor becomes unstable depending upon a variation in load.

Therefore, the technology such that a V/f value of the inverting apparatus is varied by detecting the current of the motor which is driven at a variable speed, is disclosed in the Official Gazette of Japanese Patent application Laid-Open No. 183297/1982.

However, in this case, since the variation in the motor current is large even in the stable state, the motor current, is not the optimum subject for detection of the variation of the load condition and there is a risk of erroneous detection. Consequently, it is not always best to apply such technology to the inverting apparatus of the air conditioner. In other words, the V/f value of the inverting apparatus cannot be always set to the optimum value in dependence on the load variation of the air conditioner, so that the compressor motor cannot always be stably operated with high efficiency.

SUMMARY OF THE INVENTION

It is, therefore, an object of the present invention to provide a new and improved air conditioner in which the V/f value of the inverting apparatus can be always set to the optimum value in accordance with the load variation and the compressor motor can be stably operated with high efficiency.

According to the present invention, this object is accomplished by an air conditioner having a heat exchange cycle including at least a compressor motor which is driven at a variable speed by an inverting apparatus, an indoor heat exchanger and an outdoor heat exchanger, this air conditioner comprising: memory means for storing a plurality of voltage to frequency ratio pattern data that is predetermined in accordance with different load states of the compressor motor for control of the inverting apparatus; load state detecting means, coupled at a predetermined position in the air conditioner, for detecting a variation in load of the compressor motor with respect to a plurality of predetermined states; selecting means which receives the result of detection by the load state detecting means and supplies a pattern selection signal to selectively read out the voltage to frequency ratio pattern data corresponding to this detection result to the memory means; and control means which receives the voltage to frequency ratio pattern data read out selectively from the memory means in response to the pattern selection signal and supplies a predetermined control output, corresponding to the load variation, to the inverting apparatus.

BRIEF DESCRIPTION OF THE DRAWINGS

These and other objects and features of the present invention can be understood by reference to the accompanying drawings, in which:

FIG. 7 is a diagram showing the main part of a control block of an air conditioner according to the second embodiment.

DETAILED DESCRIPTION OF THE PREFERRED EMBODIMENTS

Figure 1:
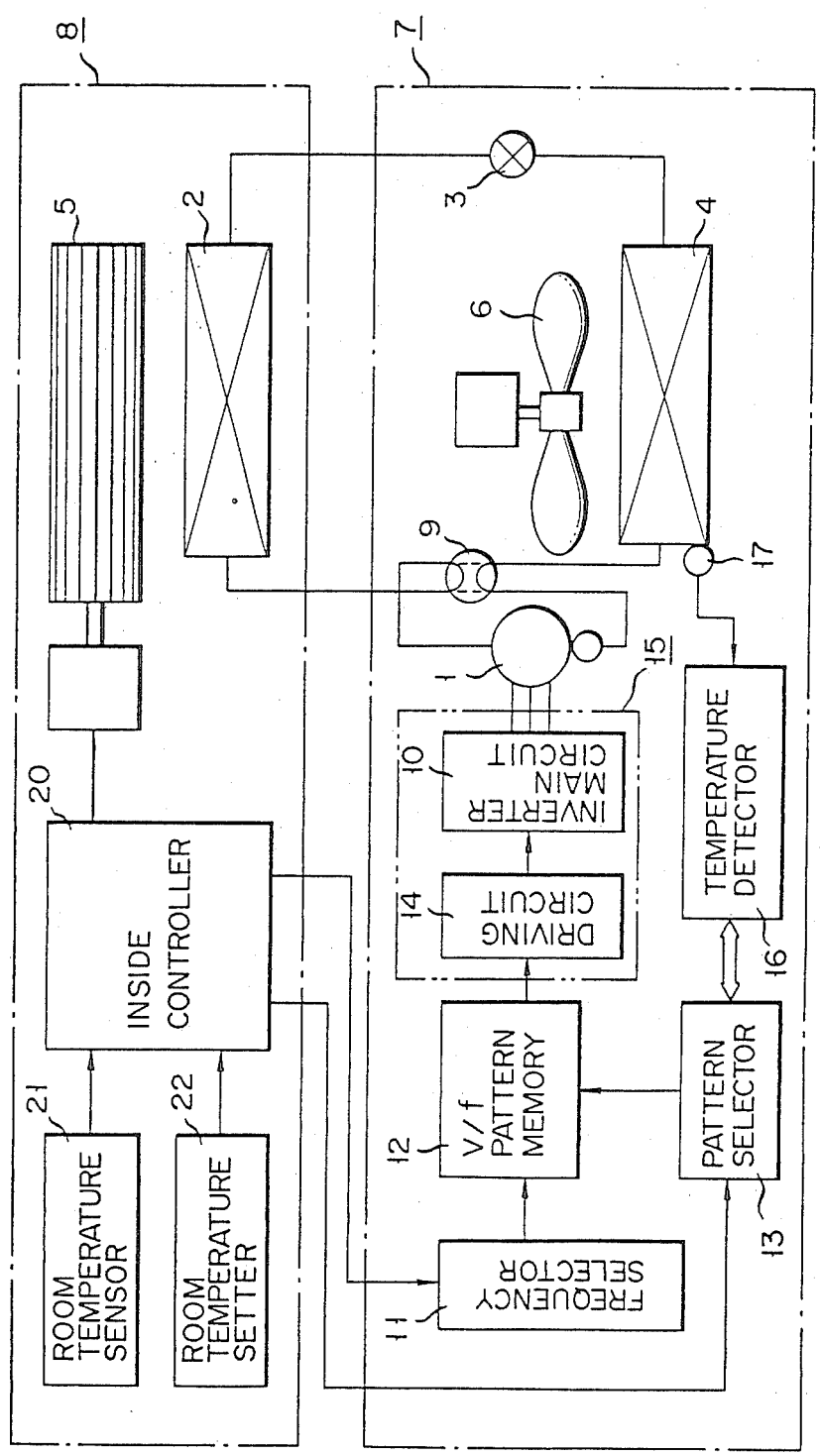
FIG. 1 is a diagram showing a heat exchange cycle and a control block of an air conditioner according to the first embodiment of the present invention.

The first embodiment of the present invention will now be described with reference to FIGS. 1 and 2. The heat exchange cycle of an air conditioner of this embodiment is of what is called the heat pump type and comprises a compressor motor 1, four-way valve 9, an indoor heat exchanger 2, a pressure reducing apparatus 3, and an outdoor heat exchanger 4. The indoor heat exchanger 2 and outdoor heat exchanger 4 are provided with an indoor air blower 5 and an outdoor air blower 6, respectively. Outputs from a room temperature sensor 21 to detect the actual room temperature and a room temperature setter 22, to set the room temperature to be controlled, which are provided in an indoor unit 8 are inputted to an inside controller 20, respectively. The inside controller 20 controls an output frequency f of an inverting apparatus 15 of an outdoor unit 7, the operation of a pattern selector 13 will be mentioned later, and, a quantity of air blow of the foregoing indoor air blower 5 in accordance with the difference between the actual room temperature detected and the set room temperature.

On one hand, a frequency selector 11 of the outdoor unit 7 receives a frequency control signal from the inside controller 20 and transmits a frequency setting signal to a V/f pattern memory 12. The V/f pattern memory 12 consists of, for instance, a read only memory. Frequency values to give four V/f patterns a to d mentioned later and voltage value data corresponding thereto have been preliminarily stored in the memory 12. The memory 12 sends a signal indicative of the selected V/f pattern to a driving circuit 14 so as to allow a main circuit 10 of the inverting apparatus 15 to control the compressor motor 1 by an output representative of the optimum V/f ratio in accordance with the frequency setting signal and pattern selection signals a to d mentioned later from the pattern selector 13.

Figure 2:
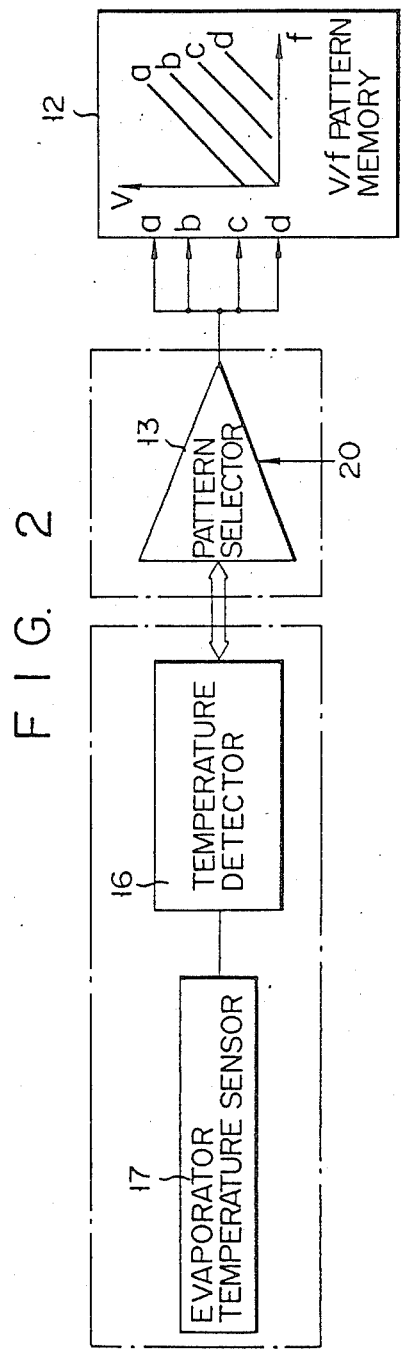
FIG. 2 is a diagram showing the main part of the control block of this air conditioner.

On the other hand, as shown in FIG. 2 as well, an evaporator temperature sensor 17 attached to the outdoor heat exchanger 4 is coupled in such a manner that its detection signal is inputted to a temperature detector 16 for detection of the temperature. The pattern selector 13 compares this detected temperature with a predetermined value to determine to which one of the temperature ranges a to d the result of this comparison belongs, and then outputs one of the pattern selection signals a to d corresponding to this decision to the V/f pattern memory 12. The pattern selection signals a to d correspond to the V/f patterns a to d stored in the memory 12 and the V/f patterns a to d are selected in response to the pattern selection signals a to d. In this case, there is such a relation between the evaporator temperature which is detected through the evaporator temperature sensor 17 and the V/f patterns a to d that, in the case of heating, the V/f characteristic values are selected so that the torque is increased in dependence upon a decrease in the evaporator temperature which is detected, namely, these V/f characteristic values increase in accordance with the order of d→a.

Therefore, the V/f pattern memory 12 reads the frequency value based on the foregoing frequency setting signal and the voltage value corresponding to this frequency value from the V/f pattern selected in accordance with the pattern selection signals a to d and then supplies the signal responsive to this frequency value and voltage value to the driving circuit 14. On one hand, the drive circuit 14 supplies a drive signal to each base of, for example, six three-phase switching transistors in the inverter main circuit 10 so as to control the compressor motor 1 by the signal responsive to the frequency value and voltage value outputted from the V/f pattern memory 12.

Figure 4:
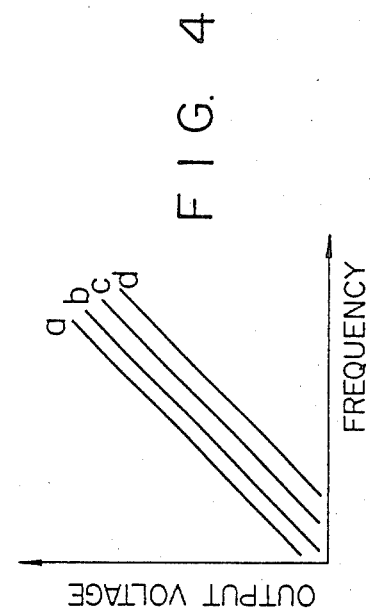
FIGS. 3 and 4 are characteristic diagrams to explain a method of determining V/f patterns a to d in the first embodiment.
Figure 3:
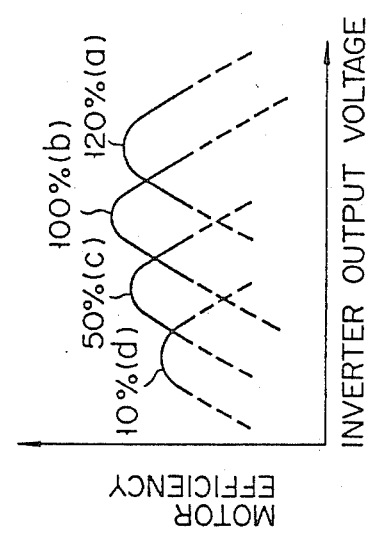

A method of determining the V/f patterns a to d and a method for this selection will now be explained. First, the characteristics of the compressor motor 1 are preliminarily examined with respect to such relations as shown in FIG. 3. Practically speaking, there are shown the characteristics regarding the relations between the motor efficiencies when a load factor of the compressor motor 1 is changed to, e.g., 120% (a), 100%(b), 50%(c), and 10%(d) and the output voltage value of the inverter. In correspondence to these characteristics, as shown in FIG. 4, the characteristic curves between the inverter output voltages such as to respectively give the maximum motor efficiencies in response to the respective load factors (a) to (d) and the frequency value, namely, the V/f patterns a to d which can correspond to the load variation are determined.

Figure 5:
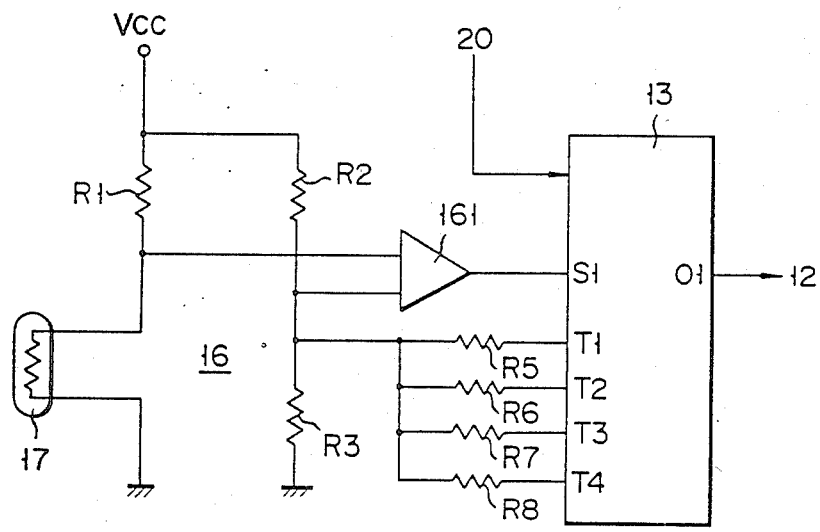
FIGS. 5 and 6 are circuit diagrams of the main part to explain a method of selecting the V/f patterns a to d in the first embodiment and a timing chart in each section.
Figure 6:
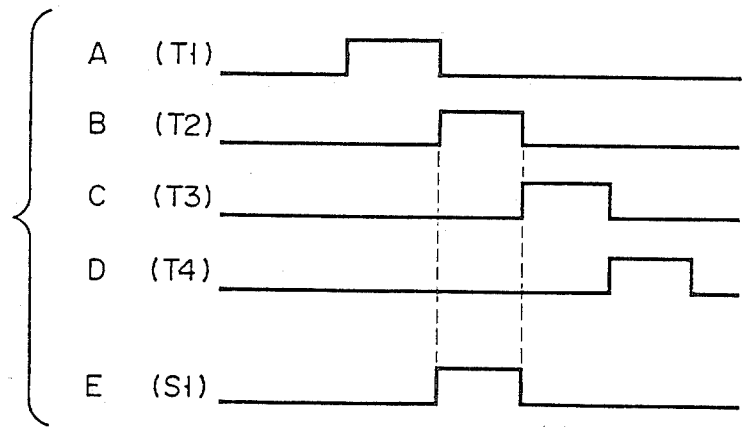

FIG. 5 shows a practical example for selection of the data of the V/f patterns a to d which are determined as described above and are stored in the V/f pattern memory 12. Namely, the evaporator temperature sensor 17 consisting of a thermistor or the like is coupled to the pattern selector 13 through the temperature detector 16 comprising a comparator 161, bias resistors $R_1$ to $R_4$ and temperature setting resistors $R_5$ to $R_8$. The pattern selector 13 consists of, e.g., a microcomputer and periodically outputs timing signals as shown in FIGS. 6A to 6D from terminals $T_1$-$T_4$ on the basis of an operation command signal from the inside controller 20 in such a manner that, for instance in the case of heating, each end of the temperature setting resistors $R_5$ to $R_8$ that are set to $-10°$ C. (a), $0°$ C. (b), $5°$ C. (c), and $10°$ C. (d) is selectively set to the ground potential. Now, it is assumed that, for example, a signal as shown in FIG. 6E is returned to a terminal $S_1$ of the pattern selector 13 from the comparator 161 due to this. In this case, it is determined that the temperature corresponding to the temperature setting resistor ($R_6$) that is grounded in response to the timing signal from the terminal $T_2$, namely, corresponding to $0°$ C. (b) was detected by the evaporator temperature sensor 17, so that the pattern selector 13 outputs the pattern selection signal to select the V/f pattern b from a terminal $O_1$. In the case where there are return signals responsive to the timing signals from the other terminals $T_1$, $T_3$ and $T_4$, the selector 13 outputs the pattern selection signal to select either one of the V/f patterns a, c and d corresponding to this return signal.

The operation of the first embodiment constituted as described above will now be explained with respect to an example of heating. First, in the ordinary state in that the load factor of the compressor motor 1 is 100%, it is assumed that the evaporator temperature which is detected by the evaporator temperature sensor 17 and temperature detector 16 is set into the state of the temperature $0°$ C. corresponding to the V/f pattern b. Thus, the V/f pattern b is selected by the pattern selector 13 and it is assumed that the compressor motor 1 is operated by means of the inverting apparatus 15 on the basis of the frequency and voltage value on the V/f pattern b which is read out from the V/f pattern memory 12. On the other hand, when the compressor motor 1 becomes the overload of the load factor of 120%, the evaporator temperature which is detected as described above decreases to $-10°$ C., so that the V/f pattern a is selected in accordance with this evaporator temperature. In this pattern a, the compressor motor 1 can be operated corresponding to the overload state since the frequency and voltage value to increase the torque (as compared with that in the ordinary load state) are given, so that the compressor motor 1 can be stably operated. Contrarily when the load factor of the compressor motor 1 decreases to 50% or 10%, the evaporator temperature which is detected as described above increases to $5°$ C. or $10°$ C., so that the V/f pattern is selected and changed to the pattern c or d. In this pattern c or d, the compressor motor 1 is operated in accordance with the light load state since the frequency and voltage value such as to reduce the torque as compared with that in the ordinary load state are given.

As described above, in the air conditioner of the first embodiment, in the case of heating, the evaporator temperature is generally set to $0°$ C. and the V/f pattern is set to b. In the case where the evaporator temperature becomes lower than $0°$ C., the V/f pattern a whose V/f ratio is larger than that of the V/f pattern b is selected. On the contrary, in the case where the evaporator temperature becomes higher than $0°$ C., the V/f pattern c or d having a small V/f ratio is selected. Therefore, the compressor motor 1 can be operated in the optimum state responsive to the heat exchange cycle such that the torque becomes large for a large load and the torque becomes small for a small load.

Next, the second embodiment will be explained on the basis of FIG. 7. In the second embodiment, a detection of an input current I to the inverting apparatus is used as means for detecting the load state of the air conditioner, and an output voltage V is determined in accordance with this input current value I. The heat exchange cycle and the like in the second embodiment are substantially similar to that in the first embodiment shown in FIG. 1.

In the second embodiment, the input current value I signal which is detected by, e.g., a current detector 30 and is supplied to the inverting apparatus 15 and the frequency setting signal from the frequency selector 11 are inputted to an I/f zone selector 33. Three zones A, B and C which are classified by two I/f patterns $P_1$ and $P_2$ are preliminarily stored in the I/f zone selector 33 as shown in FIG. 7. This selector checks to which zone among the zones A to C the input current value I and frequency set value f at that time belong, and then transmits either one of pattern selection signals A to C to a V/f pattern memory 31 in accordance with the result of this discrimination. In a similar manner as above, three V/f patterns A to C are preliminarily stored in the memory 31. Either one of the V/f patterns A to C is selected in response to one of the pattern selection signals A to C from the I/f zone selector 33. Also, the voltage value V corresponding to a frequency set value f from the frequency selector 11 is outputted to the inverting apparatus 15 on the basis of the V/f pattern selected. The inverting apparatus 15 sends the control output based on the frequency set value f from the frequency selector 11 and on the voltage value V from the V/f pattern memory 31 to the compressor motor 1.

As described above, in the second embodiment, in the case of heating, the compressor motor 1 is ordinarily operated in keeping with the B pattern. However, when the input current value I which is supplied to the inverting apparatus 15 is large, the motor 1 is operated on the basis of the C pattern whose V/f ratio is large. On the contrary, upon light load in which the input current value I is small, the motor 1 is operated by the A pattern. Consequently, the compressor motor 1 can always be stably operated with the torque responsive to the change of the load of the motor 1.

Figure 8:
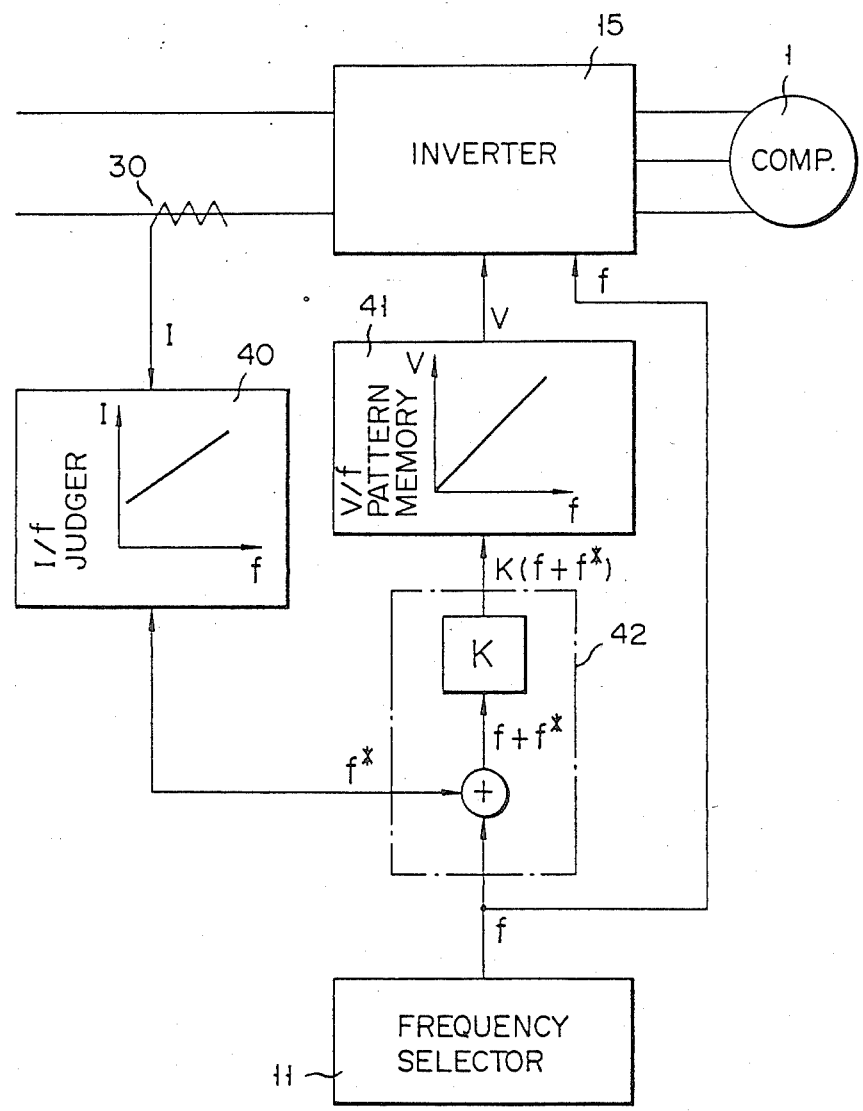
FIG. 8 is a diagram showing the main part of a control block of an air conditioner according to the third embodiment of the invention.

The third embodiment will now be described with reference to FIG. 8. This embodiment is constituted by an I/f judger 40 serving as a reference, an arithmetic operating circuit 42 to perform the arithmetic operation of $K(f+f^*)$ based on frequency information $f^*$ due to this judger and the actual frequency f, and a V/f pattern memory 41. The operation of the circuit according to the third embodiment will be explained. The frequency information $f^*$ is derived by the I/f judger 40 from the input current I that is detected by the current detector 30 and supplied to the inverting apparatus 15. The arithmetic operation $K(f+f^*)$ (where K is a constant) is performed from the above-mentioned $f^*$ and the actual frequency set value f. Then, the result f' of this operation is inputted to the V/f pattern memory 41 and thereby determining the voltage V. The inverting apparatus 15 controls the compressor motor 1 by the output based on the voltage V from the memory 41 and on the set frequency f from the frequency selector 11.

According to the third embodiment, it is possible to perform the high efficient control of the compressor motor 1 that is stable for not only the change in load of the air conditioner but also the change in output frequency due to the inverting apparatus 15. In other words, similarly to the second embodiment, since the input current I to the inverting apparatus 15 is detected, the current waveform is stable and the chance of a malfunction is small and further the current feedback is constituted, so that a stable system is obtained.

As described above, the V/f patterns are stored in the case of the third embodiment, but the arithmetic operation is performed and the output voltage V corresponding to f may be obtained.

As described in detail in the above, according to the present invention, the load condition of the heat exchange cycle is stably detected and the V/f ratio of the inverting apparatus which drives the compressor motor in response to this load condition detected is controlled by selecting the optimum pattern from a plurality of prestored V/f patterns. Therefore, the compressor motor can always be stably operated.

What is claimed is:

1. An air conditioner having a heat exchange cycle which includes at least a compressor motor that is driven by an inverting apparatus at a variable speed, an indoor heat exchanger and an outdoor heat exchanger, said air conditioner comprising:

memory means for storing a plurality of voltage to frequency ratio pattern data which are predetermined in accordance with different load states of said compressor motor for the control of said inverting apparatus;

load state detecting means, connected to said inverting apparatus, for detecting a variation in load of said compressor motor with respect to a plurality of predetermined states, said load state detecting means including a current detecting means for detecting an input current to said inverting apparatus;

selecting means for receiving the result of detection by said load state detecting means and supplying to said memory means a pattern selection signal to selectively read out the voltage to frequency ratio pattern data corresponding to said detection result; and control means for receiving the voltage to frequency ratio pattern data read out selectively from said memory means in response to said pattern selection signal and supplying a predetermined control output corresponding to the load variation to said inverting apparatus.

2. An air conditioner according to claim 1, wherein said selecting menas is constituted as a current to frequency ratio zone selector for discriminating to which zone among a plurality of prestored current to frequency ratio zones an output from said current detecting means and a preset frequency setting signal belong and for outputting said pattern selection signal.

3. An air conditioner having a heat exchange cycle which includes at least a compressor motor that is driven by an inverting apparatus at a variable speed, an indoor heat exchanger and an outdoor heat exchanger, said air conditioner comprising:

input current detecting means for detecting an input current, to said inverting apparatus;

frequency information discriminating means which receives the input current detected by said input current detecting means and discriminates frequency information corresponding to said input current;

arithmetic operating means which receives the frequency information discriminated by said frequency information discriminating means and a preset frequency value and calculates frequency variation information;

voltage output means which receives the frequency variation information calculated by said arithmetic operating means and outputs a voltage value corresponding to said frequency variation information; and control means which receives the voltage value outputted from said voltage output means and the preset frequency value and supplies a predetermined control output corresponding to a load variation to said inverting means.

4. An air conditioner according to claim 3, wherein said voltage output means reads out the voltage value corresponding to said frequency variation information from a prestored voltage to frequency ratio pattern memory.

* * * * *